(12) United States Patent
Fujimura et al.

(10) Patent No.: US 8,115,850 B2
(45) Date of Patent: Feb. 14, 2012

(54) SOLID-STATE IMAGING APPARATUS AND DRIVING METHOD FOR THE SAME

(75) Inventors: Masaru Fujimura, Yokohama (JP); Katsuhito Sakurai, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 60 days.

(21) Appl. No.: 12/796,367

(22) Filed: Jun. 8, 2010

(65) Prior Publication Data

US 2011/0007193 A1      Jan. 13, 2011

(30) Foreign Application Priority Data

Jul. 13, 2009    (JP) .................................. 2009-165056

(51) Int. Cl.
*H04N 3/14*      (2006.01)
(52) U.S. Cl. ......................................... 348/308; 348/296
(58) Field of Classification Search .................. 348/294, 348/296, 302, 308
See application file for complete search history.

(56) References Cited

U.S. PATENT DOCUMENTS

| 7,515,183 | B2 * | 4/2009 | Yang et al. ..................... 348/241 |
| 7,982,789 | B2 * | 7/2011 | Watanabe et al. ............. 348/308 |
| 2004/0183930 | A1 * | 9/2004 | Masuyama et al. ........... 348/294 |
| 2005/0270392 | A1 * | 12/2005 | Kikuchi ......................... 348/308 |
| 2009/0303369 | A1 * | 12/2009 | Noda et al. ..................... 348/308 |
| 2010/0110237 | A1 * | 5/2010 | Hashimoto et al. ........... 348/241 |
| 2011/0157444 | A1 * | 6/2011 | Gerstenberger et al. ...... 348/308 |

FOREIGN PATENT DOCUMENTS

| JP | 2004-304771 A | 10/2004 |
| JP | 2007-267290 A | 10/2007 |

* cited by examiner

*Primary Examiner* — Timothy J Henn
(74) *Attorney, Agent, or Firm* — Fitzpatrick, Cella, Harper & Scinto

(57) ABSTRACT

A solid-state imaging apparatus includes: a plurality of pixels generating pixel signals; color filters above the photoelectric conversion elements; a row selecting unit for selecting a plurality of rows of the pixels; a signal line receiving the pixel signal from the pixels of the row selected by the row selecting unit; a plurality of capacitors for accumulating the pixel signal outputted to the signal line; and a plurality of selecting switches connected between the signal line and the plurality of capacitors. During a first adding operation, the row selecting unit adds pixel signals accumulated in a part of the capacitors on the signal line. And, during a second adding operation, the row selecting unit adds pixel signals accumulated in other part of the capacitors with the pixel signals from the pixels of a row different from the row of which pixel signals are added in the first adding operation.

6 Claims, 6 Drawing Sheets

BEFORE ADDING

MIXING RATIO OF PIXEL SIGNALS AFTER ADDING

AFTER ADDING

SOLID-STATE IMAGING APPARATUS AND DRIVING METHOD FOR THE SAME

BACKGROUND OF THE INVENTION

1. Field of the Invention

The present invention relates to a solid-state imaging apparatus and a driving method thereof.

2. Description of the Related Art

Solid-state imaging apparatuses have come to comprise an increasing number of pixels and provide a higher processing speed in recent years. In an operation mode that uses a large number of pixels and of which a high output rate is required, additions of pixels in column or row direction may be performed. An example of addition in column direction performed in a solid-state imaging apparatus is described in Japanese Patent Application Laid-Open No. 2004-304771 discussed below. An example of combination of added pixels for addition in vertical direction is disclosed in Japanese Patent Application Laid-Open No. 2007-267290. A technique described in Japanese Patent Application Laid-Open No. 2007-267290 suppresses generation of a pseudo signal by adopting such a combination that makes color gravity centers after addition equally spaced.

The way of combining added pixels disclosed in Japanese Patent Application Laid-Open No. 2007-267290 however utilizes only signals from five pixels out of twelve pixel rows, causing loss of pixel signals. As would be obvious, using all pixel signals is the pixel combination that minimizes signal loss. Also, when pixels in every third row are added using an adding operation shown Japanese Patent Application Laid-Open No. 2004-304771, color gravity centers for respective colors are not equally spaced and degradation in image quality caused by a pseudo signal occurs.

SUMMARY OF THE INVENTION

An object of the present invention is to provide a solid-state imaging apparatus and a driving method thereof that are capable of performing vertical adding operations without causing misalignment of color gravity centers.

In order to achieve the above object, the present invention provides a solid-state imaging apparatus comprising; a plurality of pixels arranged two dimensionally wherein each of pixels includes a photoelectric conversion element for generating a pixel signal by photoelectric conversion, a plurality of color filters of a plurality of colors arranged above the photoelectric conversion elements, a row selecting unit for selecting a row of the pixels, a signal line to which the pixel signal is output from the pixels of the row selected by the row selecting unit, a plurality of capacitors for accumulating the pixel signal output to the signal line; and a plurality of selecting switches each connected between the signal line and corresponding one of the plurality of capacitors, wherein, during a first adding operation, the row selecting unit selects a plurality of rows of the pixels successively and the selecting switches are controlled to accumulate, in a part of the plurality of capacitors, each of the pixel signals from the pixels, with which the color filters of the same color are associated, thereafter, the selecting switch operates to add, on the signal line, the pixel signals accumulated in the part of the plurality of capacitors, during a second adding operation after the first adding operation, the row selecting unit selects another plurality of rows of the pixels successively and the selecting switches are controlled to accumulate, in a part of the plurality of capacitors, each of the pixel signals from the pixels, with which the color filters of the same color are associated, thereafter, the selecting switch operates to add, on the signal line, the pixel signals accumulated in the part of the plurality of capacitors, and, during the first adding operation, the row selecting unit controls the selecting switches to add, on the signal line, the pixel signals accumulated in the part of the plurality of capacitors, while, during the second adding operation, the row selecting unit controls the selecting switches to add the pixel signals accumulated in the other part of the plurality of capacitors with the pixel signals from the pixels of a row different from the row of the pixels of which pixel signals are added in the first adding operation.

Vertical adding operations using pixels signals from all rows are enabled, and vertical adding operations can be performed without causing misalignment of color gravity centers.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
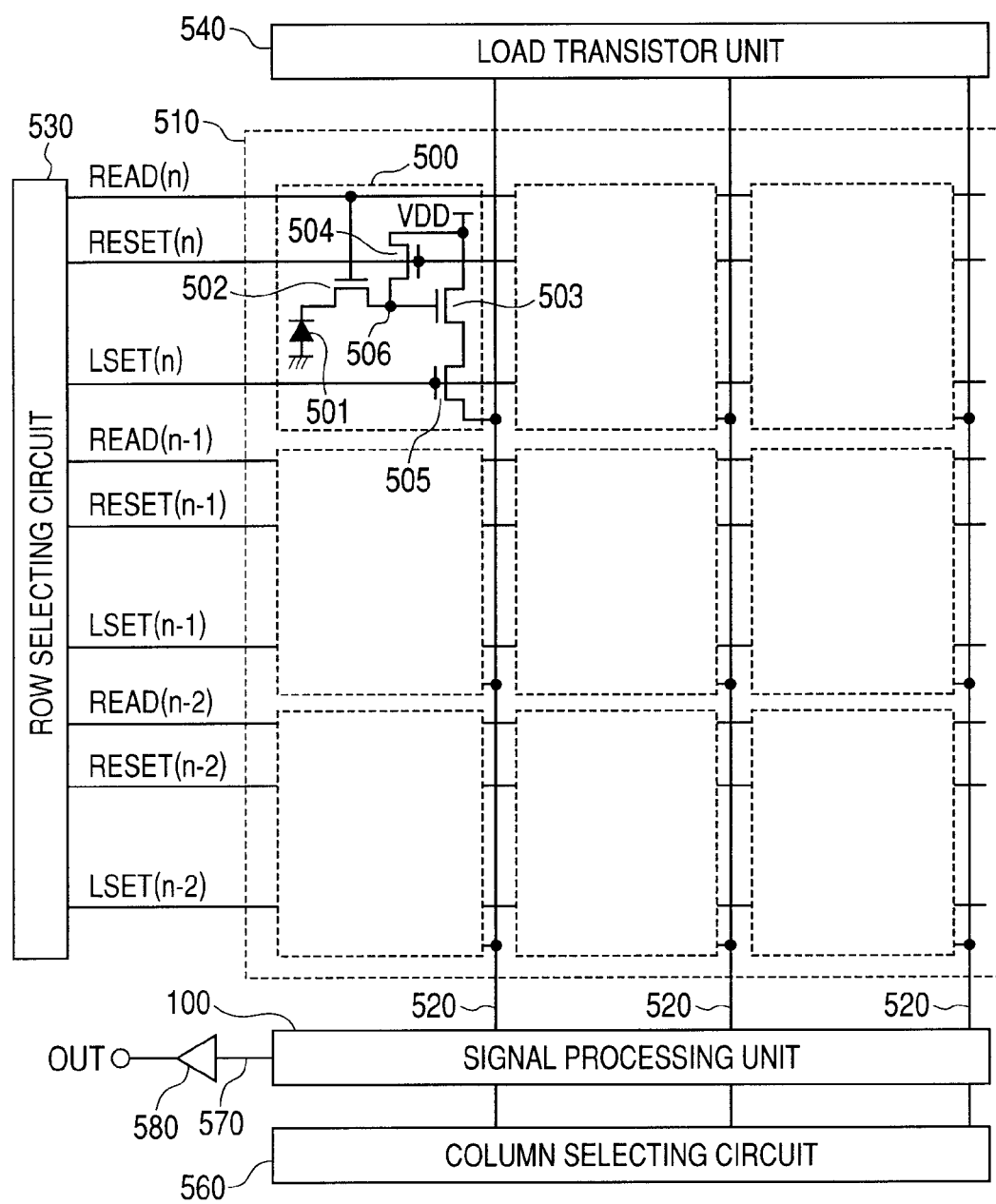
FIG. 1 is a circuit diagram of a solid-state imaging apparatus according to a first embodiment of the present invention.

FIG. 1 is a circuit diagram illustrating an exemplary configuration of a solid-state imaging apparatus according to a first embodiment of the invention. The solid-state imaging apparatus of the first embodiment has an operation mode that does not perform pixel addition and an operation mode that performs two-row addition. The solid-state imaging apparatus includes a pixel region portion 510 in which pixels 500 are two-dimensionally arranged, a row selecting circuit (a row selecting unit) 530 for selecting a row of pixels 500, and a column selecting circuit (a column selecting unit) 560 for selecting a column of pixels 500. The row selecting circuit 530 is a decoder, for example. A vertical signal line 520, to which output terminals of pixels 500 in column direction are connected in common, is connected with a load transistor unit 540 for driving transistors in the pixels 500 and a signal processing unit 100. To the vertical signal line 520, pixel signals from pixels 500 in a row selected by the row selecting circuit 530 are output. An output terminal of the signal processing unit 100 is connected with a horizontal common line 570. The horizontal common line 570 is connected with an input terminal of an output amplifier 580, and an output terminal of the output amplifier 580 is connected with an output terminal OUT of the solid-state imaging apparatus.

The configuration of the pixel 500 is described next. The pixel 500 has a photodiode 501 for photoelectric conversion, a floating diffusion portion (FD portion) 506, and transistors 502 to 505. The photodiode 501 is a photoelectric conversion element that generates a pixel signal by photoelectric conversion. A transfer MOS transistor 502 is a transistor for transferring electric charges in the photodiode 501 to the FD portion 506. A reset MOS transistor 504 is a transistor for resetting electric charges in the FD portion 506. An amplifying MOS transistor 503 is a transistor for converting an electric charge signal from the FD portion 506 into a voltage. A selecting MOS transistor 505 is a transistor for selecting a row by coupling an output signal from the amplifying MOS transistor 503 to the vertical signal line 520.

A source and a drain of the transfer MOS transistor 502 are connected with the photodiode 501 and the FD portion 506. The drain and source of the reset MOS transistor 504 are connected with the FD portion 506 and a node of supply voltage VDD, respectively. The drain, gate, and source of the amplifying MOS transistor 503 are respectively connected with the node of supply voltage VDD, the FD portion 506, and the source of the selecting MOS transistor 505. The drain of the selecting MOS transistor 505 is connected with the vertical signal line 520. The row selecting circuit 530 has a control line READ (n) for turning on the transfer MOS transistor 502, a control line RESET (n) for turning on the reset MOS transistor 504, and a control line LSET (n) for turning on the selecting MOS transistor 505. These control lines are connected with the gates of the MOS transistors 502, 504 and 505 of pixel 500, respectively.

Figure 2:
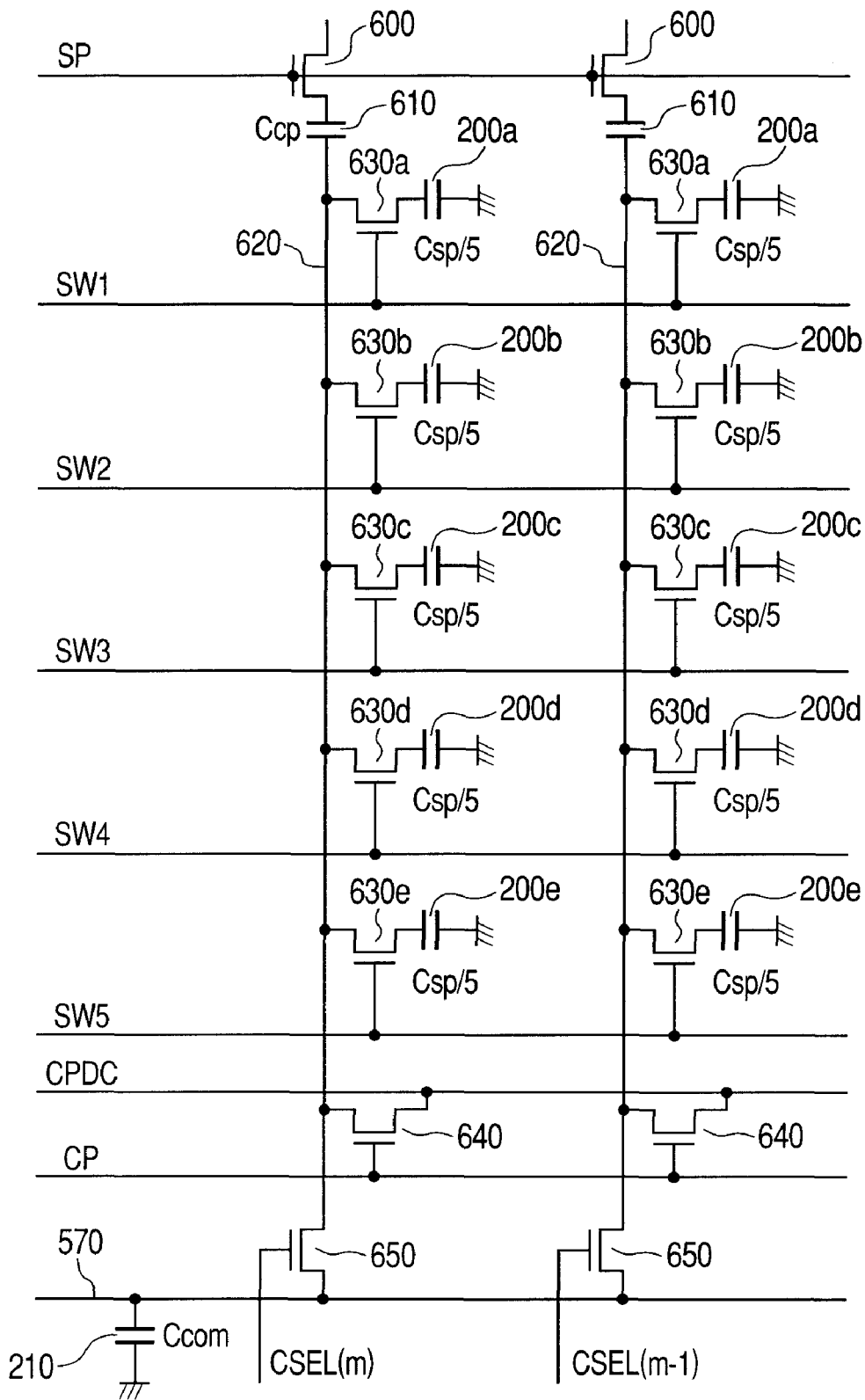
FIG. 2 is a circuit diagram of a signal processing unit according to the first embodiment of the invention.

FIG. 2 is a circuit diagram illustrating an exemplary configuration of the signal processing unit 100 of FIG. 1. As the signal processing unit 100 is formed of multiple columns and all the columns have a similar structure, descriptions for one column are provided. One end of source and drain of a sampling switch for sampling and holding 600 is connected with the vertical signal line 520 of FIG. 1, and the other end is connected with one end of a clamp capacitor 610. The other end of the clamp capacitor 610 is connected with a vertical signal line 620. Capacitor selecting switches 630a to 630e are connected between the vertical signal line 620 and accumulating capacitors 200a to 200e. When the capacitor selecting switches 630a to 630e turn on with a signal supplied from the row selecting unit 530, a pixel signal output on the vertical signal line 620 is accumulated in the accumulating capacitors 200a to 200e. The accumulating capacitors 200a to 200e are capacitors connected in parallel with each other for sampling and holding pixel signals. Further, to the vertical signal line 620, a node of clamp voltage CPDC is connected via a clamp switch 640. The vertical signal line 620 is connected with the horizontal common line 570 via a horizontal line transfer switch 650. Reference numeral 210 denotes a parasitic capacitance of the horizontal common line 570. A control line SP is connected with the gate of a MOS transistor in a sampling switch 600. Control lines SW1, SW2, SW3, SW4 and SW5 are connected with the gates of MOS transistors in the capacitor selecting switches 630a to 630e, respectively. A control line CP is connected with the gate of a MOS transistor in the clamp switch 640. When the total capacitance value of the five accumulating/sampling capacitors 200a to 200e is denoted as Csp, the capacitors 200a to 200e each have an equal capacitance value of Csp/5. Individual columns have the same structure, and their signal paths are connected to the horizontal common line 570 in common. Voltage of control lines CSEL (m) and CSEL (m-1), which are connected with the gate of the horizontal line transfer switches 650, is controlled by the column selecting circuit 560 of FIG. 1.

Now, a driving method for the solid-state imaging apparatus of FIGS. 1 and 2 is described. First, an operation mode that does not perform pixel addition is described with the driving timing chart of FIG. 3. Pulse names correspond to the names of the control lines shown in FIG. 2. Also, when the pulses are at high-level, corresponding switch MOS transistors become ON, and when the pulses are at low-level, corresponding switch MOS transistors become OFF. A distinguishing feature of the operation mode without pixel addition is that all of the control lines SW1 to SW5 are at high level and all of the capacitor selecting switches 630a to 630e are ON during operation.

Operations in the nth row are described next. First, at time T0, the control line LSET (n) becomes high level, the selecting MOS transistor 505 turns on, and the amplifying MOS transistor 503 performs source follower operations. At the same time, the sampling switch 600 and the clamp switch 640 are also turned on. Then, at time T1, the control line RESET (n) becomes high level for a certain time period, and the FD portion 506 is at approximately the supply voltage VDD, and is reset. Thereafter, at time T2, the clamp pulse CLP becomes low level, causing a potential difference between the output voltage of the vertical signal line 520 and clamp voltage CPDC at the time to be held between both ends of the clamp capacitor 610. Then, at time T3, the control line READ (n) becomes high level, causing electric charges accumulated in the photodiode 501 to be transferred to the FD portion 506 and a voltage change corresponding to the amount of the electric charges to occur on the vertical signal line 520. Because a terminal of the clamp capacitor 610 on the side of the vertical signal line 620 is at high impedance, a voltage change occurring at the terminal of the clamp capacitor 610 on the side of the vertical signal line 520 appears at the terminal on the side of the vertical signal line 620 at a certain voltage ratio according to the law of charge conservation for the clamp capacitor 610. The voltage change is calculated in the following manner. The relation of Equation (1) below holds when ΔV represents the voltage change occurring on the vertical signal line 620, ΔVin represents a voltage change on the vertical signal line 520, Ccp represents the capacitance value of the clamp capacitor 610, and Csp represents the capacitance value of the sampling/holding capacitors 200a to 200e:

$$\Delta V = Ccp/Csp \times \Delta Vin \tag{1}$$

Then, at time T4, the control line SP becomes low level, causing the voltage of the vertical signal line 620 including the voltage change ΔV to be held in the accumulating capacitors 200a to 200e. Then, at times T5 and T6, control lines CSEL (m) and CSEL (m-1) connected with the gates of the horizontal line transfer switches 650 sequentially become high level, causing the voltage change to be output to the horizontal common line 570, amplified or buffered by the amplifier 580, and output to the output terminal OUT. This output voltage ΔVout is represented by Equation (2), where Ccom represents the capacitance value of the parasitic capacitance 210 of the horizontal common line 570 and Gamp represents the gain of the output amplifier 580. Similar operations take place in the n+1th and subsequent rows as well.

$$\Delta Vout = \Delta V \times Csp/(Csp+Ccom) \times Gamp \tag{2}$$

Figure 4A:
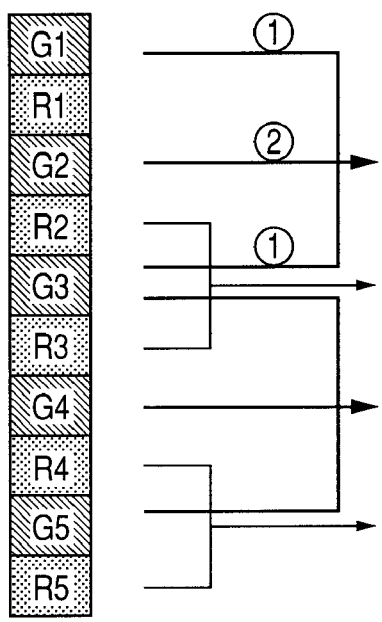
FIGS. 4A and 4B illustrate positions of color gravity centers that are realized.

Now, the operation mode with two-row addition will be described using FIGS. 4A and 4B for color gravity center after addition in the present embodiment and FIG. 5 for the driving method. FIG. 4A illustrates a portion of a pixel array in a color solid-state imaging apparatus with color filters of multiple colors in Bayer array arranged over the photodiode 501. G (green) pixels Gn and R (red) pixels Rn are alternately arranged in the vertical direction. The letter "n" represents a numerical subscript, indicating that the pixel is in the nth row. For example, "Gn" means a pixel in the nth row among green pixels.

Figure 4B:
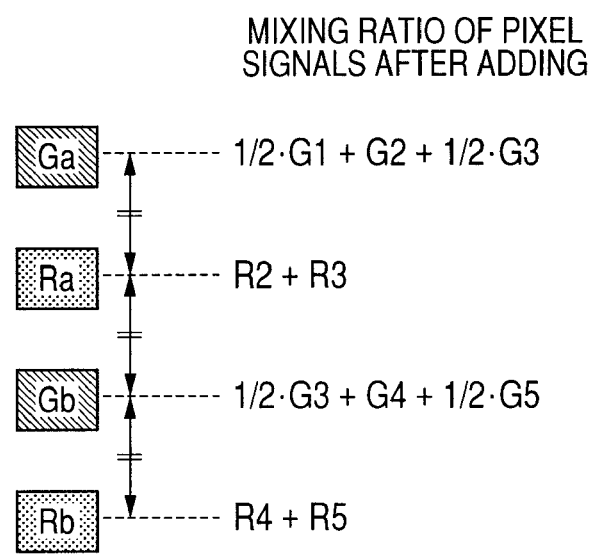

FIG. 4B illustrates a signal array after adding according to the present embodiment, where G pixels and R pixels are equally spaced. To make the signal array after adding equally spaced, vertical two-pixel addition according to the embodiment adds G pixels with a weighting ratio that makes three consecutive rows have a signal ratio of 1st row:2nd row:3rd row=1:2:1. For example, pixel signals Ga and Gb are generated according to Equations (3) and (4):

$$Ga=(1/2)\times G1+G2+(1/2)\times G3 \quad (3)$$

$$Gb=(1/2)\times G3+G4+(1/2)\times G5 \quad (4)$$

Here, the signal in the row of pixel G3 is necessary for both an adding operation for generating Ga and an adding operation for generating Gb.

For R pixels, pixel signals Ra and Rb are generated according to Equations (5) and (6):

$$Ra=R2+R3 \quad (5)$$

$$Rb=R4+R5 \quad (6)$$

Figure 3:
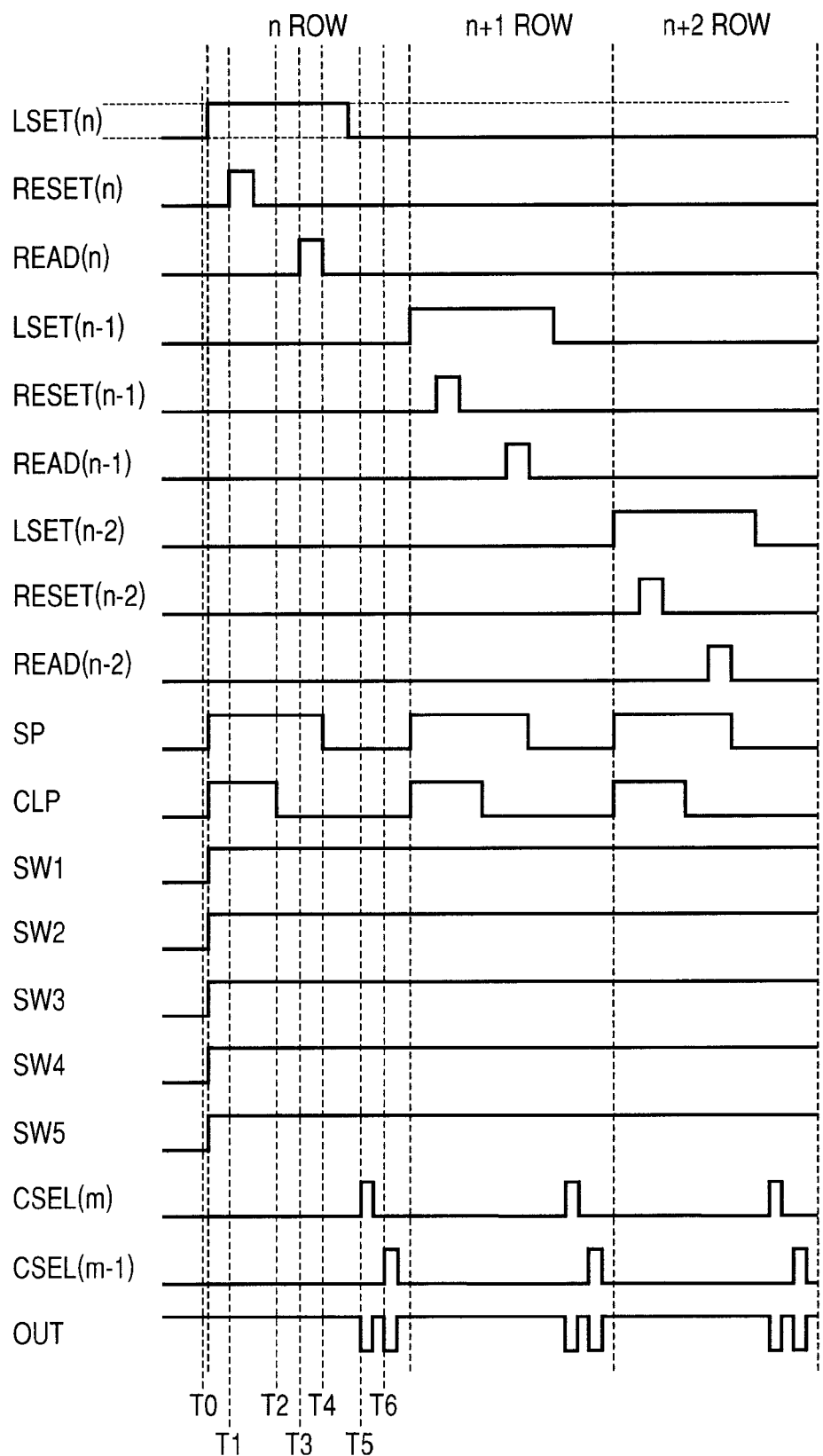
FIG. 3 is a driving timing chart for an operation mode without pixel addition in the first embodiment.
Figure 5:
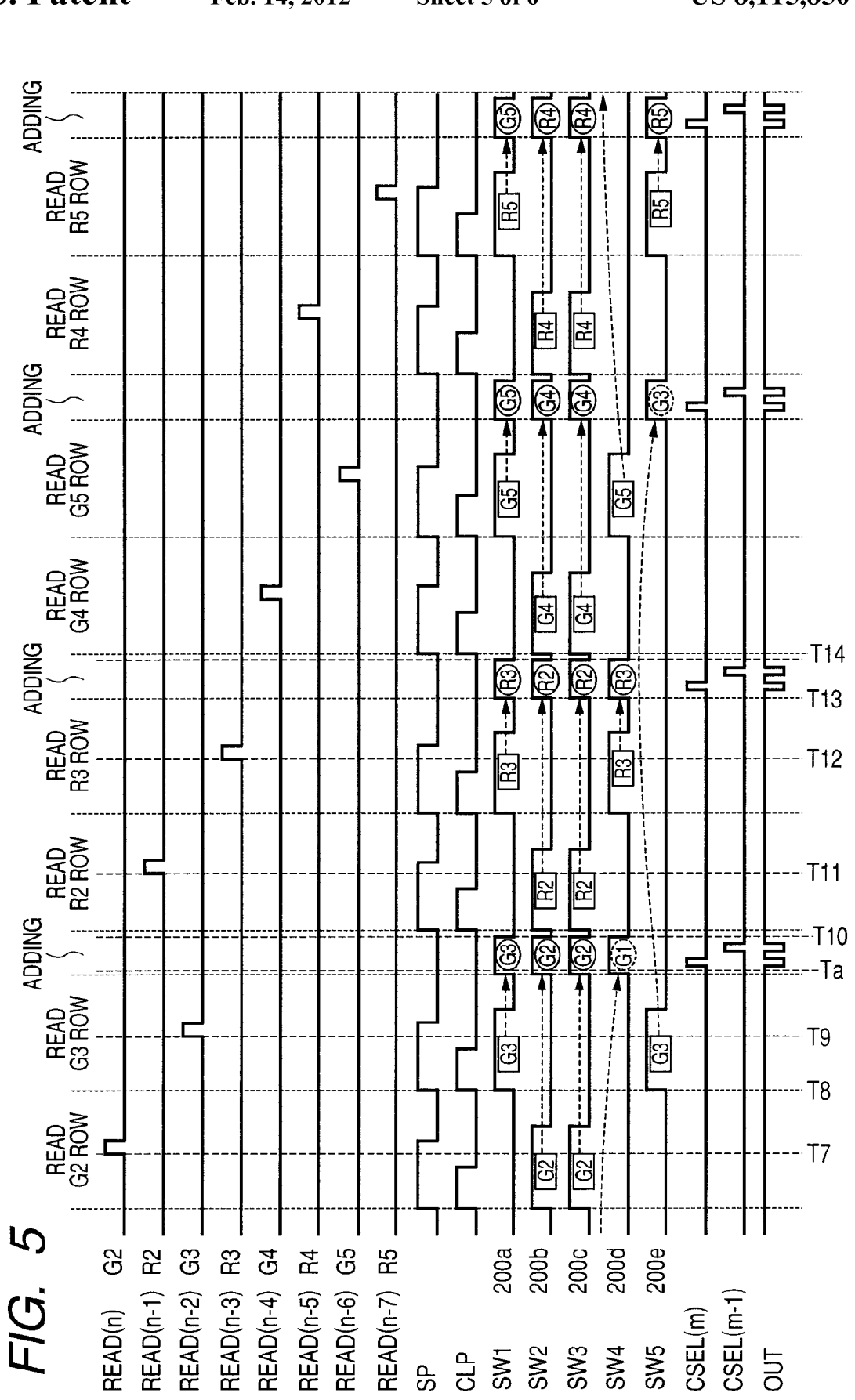
FIG. 5 is a driving timing chart for two-row adding operation mode.

In the driving timing chart of FIG. 5, because driving of a terminal having a corresponding pulse name is similar to that performed in the operation mode without pixel addition illustrated in FIG. 3, only features of this operation mode are described. Also, because relation of operation timing among the pixel driving pulses RESET (n), READ (n), and LSET (n) is the same as the relation in the operation illustrated in FIG. 3, descriptions on LSET (n) and RESET (n) are omitted. The nth row corresponds to G2 row in the pixel array of FIG. 4A, and the n-1th row to R2 row, the n-2th row to G3 row, and so on.

(Readout of G2 Row)

First, at time T7, by putting the control line READ (n) to high level while the control lines SW2 and SW3 of the capacitor selecting switches 630b and 630c are at high level, a pixel signal on the G2 row is held in the accumulating capacitors 200b and 200c.

(Readout of G3 Row)

At time T8, by putting the control line READ (n-2) to high level while control lines SW1 and SW5 of the capacitor selecting switches 630a and 630e are at high level, a pixel signal on the G3 row is held in the accumulating capacitors 200a and 200e. As will be described in Read G5 Row below, the signal on the G1 row is already held in the accumulating capacitor 200d. Reading to the horizontal common line 570 which is performed for every row in the operation mode without pixel addition is not carried out for every row in this operation mode.

(Adding)

After completion of sampling and holding in the nth and n-2th rows, all of the control lines SW1 to SW4 are put to high level during time Ta to T10, thereby connecting the accumulating capacitors 200a to 200d to the vertical signal line 620. Here, the signal of the G2 row held in the accumulating capacitors 200b and 200c is denoted as $\Delta V_{G2}$, the signal of the G3 row retained in the accumulating capacitor 200a as $\Delta V_{G3}$, and the signal of the G1 row already held in the accumulating capacitor 200d as $\Delta V_{G1}$. Then, voltage $\Delta V2$ of the vertical signal line 620 is represented by Equation (7), being a weighted average of the signals in the three rows:

$$\Delta V2=\{(Csp/5)\times\Delta V_{G1}+(Csp/5+Csp/5)\times\Delta V_{G2}+(Csp/5)\times \Delta V_{G3}\}/\{4\times(Csp/5)\}=(\Delta V_{G1}+2\Delta V_{G2}+\Delta V_{G3})/4 \quad (7)$$

Here, the control line SW5 is at low level, and some of signals on the G3 row held in the accumulating capacitor 200e are retained without being added. Then, in response to signals CSEL (m) and CSEL (m-1) from the column selecting circuit 560, signals in the mth and m-1th rows are output to the horizontal common line 570. Output voltage $\Delta$Vout to the output terminal OUT is represented by Equation (8), where Csp'=4/5 Csp:

$$\Delta\text{Vout}=\Delta V2\times Csp'/(Csp'+Ccom)\times Gamp \quad (8)$$

(Readout of R2 Row)

Thereafter, at time T11, by putting the control line READ (n-1) to high level while the control lines SW2 and SW3 of the capacitor selecting switches 630b and 630c are at high level, the pixel signal of the R2 row is held in the accumulating capacitors 200b and 200c.

(Readout of R3 Row)

Then, at time T12, by putting the control line READ (n-4) to high level while the control lines SW1 and SW4 of the capacitor selecting switches 630a and 630d are at high level, the pixel signal of the R3 row is held in the accumulating capacitors 200a and 200d.

(Adding)

After completion of sampling and holding in the n-1th and n-4th rows, all of the control lines SW1 to SW4 are put to high level during time T13 to T14, thereby connecting the accumulating capacitors 200a to 200d to the vertical signal line 620. Here, when the signal of the R2 row retained in the accumulating capacitors 200b and 200c is denoted as $\Delta V_{R2}$ and the signal of the R3 row retained in the accumulating capacitors 200a and 200d is denoted as $\Delta V_{R3}$, voltage $\Delta V3$ of the vertical signal line 620 is represented by Equation (9), being an average of the signals of the two rows:

$$\Delta V3=\{(Csp/5+Csp/5)\times\Delta V_{R2}+(Csp/5+Csp/5)\times\Delta V_{R3}\}/ \{4\times(Csp/5)\}=(\Delta V_{R2}+\Delta V_{R3})/2 \quad (9)$$

In the following Read G4 Row and Read G5 Row operations in FIG. 5, the signal of the G4 row is read into the accumulating capacitors 200b and 200c, i.e., the signal is sampled and held, and the signal of the G5 row is read into the accumulating capacitors 200a and 200d. An adding operation after reading performs a weighted addition by adding the signal of the G3 row that has been retained in the accumulating capacitor 200e, the signal of the G4 row retained in the accumulating capacitors 200b and 200c, and the signal of the G5 row in the accumulating capacitor 200a. The signal in the accumulating capacitor 200d will be held until the next adding operation.

As described above, with the solid-state imaging apparatus according to the present embodiment, vertical adding operations can be performed without causing misalignment of color gravity centers even in vertical addition in units of two rows in a color solid-state imaging apparatus. In addition, although the present embodiment illustrates the five accumulating capacitors 200a to 200e as having an equal capacitance value, this is not limitative. For example, the present embodiment is also effective when capacitance allocation ratio is changed such as by integrating the accumulating capacitors 200b and 200c into one capacitor having a capacitance value of ⅖ Csp, instead of two capacitors, and reducing the number of sampling switches 630a to 630e. In this case, accumulating capacitors 200a, 200d and 200e each have a capacitance value that is half the capacitance value of the accumulating capacitors 200b and 200c.

Second Embodiment

Figure 6:
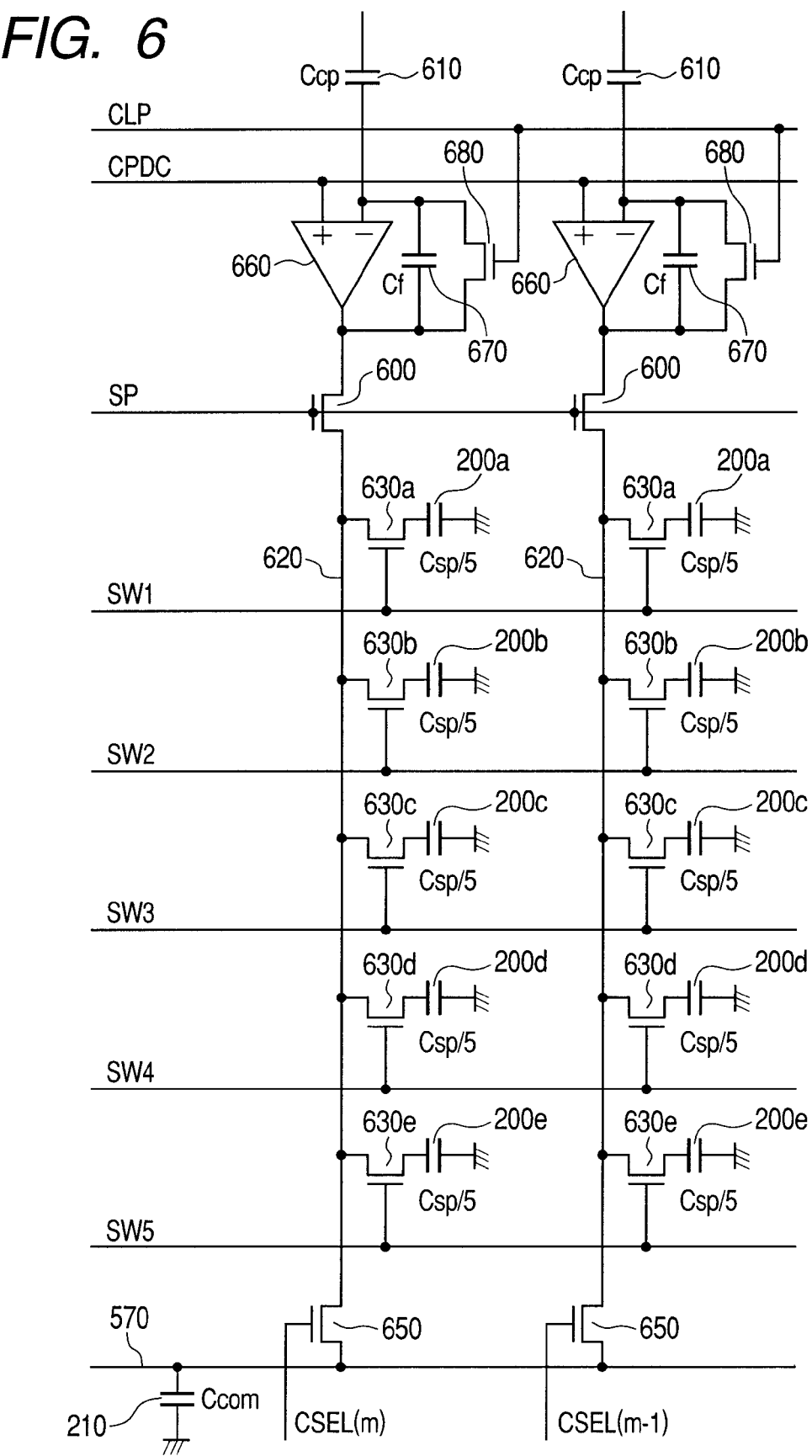
FIG. 6 is a circuit diagram of the signal processing unit according to a second embodiment of the invention.

A solid-state imaging apparatus according to a second embodiment of the invention is described. In the solid-state imaging apparatus of the present embodiment, the signal processing unit 100 of FIG. 1 has a different configuration. A specific circuit configuration of the signal processing unit 100 is described with FIG. 6. In FIG. 6, the same components as those of the signal processing unit 100 of the first embodiment are given the same reference numerals or symbols. Components characteristic to the second embodiment are described. Between the clamp capacitor 610 and the vertical signal line 620, a column gain amplifier 660 is provided. To an inverting input terminal of the column gain amplifier 660, one end of the clamp capacitor 610 is connected, and to a non-inverting input terminal of the column gain amplifier 660, a node of clamp voltage CPDC is connected. Between the output terminal and the inverting input terminal of the column gain amplifier 660, a clamp MOS transistor 680 for clamping and a feedback capacitor 670 are connected in parallel. The clamp MOS transistor 680 also serves as a discharger for the feedback capacitor 670. Between the output terminal of the column gain amplifier 660 and the vertical signal line 620, a sampling and holding MOS transistor 600 is connected.

As driving pulses of the present embodiment are the same as the first embodiment, the pulses are described using FIG. 3. For the sake of brevity, an operation mode without pixel addition is described. Operations in the nth row will be shown. At time T0, the control line LSET (n) becomes high level, the selecting MOS transistor 505 becomes ON, and the amplifying MOS transistor 503 performs source follower operations. At the same time, the sampling and holding MOS transistor 600 and the clamp MOS transistor 680 are also turned on. At this point, the column gain amplifier 660 functions as a buffer, and the non-inverting input terminal thereof is at the clamp voltage CPDC. Also, because both ends of the feedback capacitor 670 are at the same potential, electric charges in the feedback capacitor 670 are discharged. Next, the control line RESET (n) becomes high level from time T1, and the FD portion 506 carries approximately the supply voltage VDD and is reset.

At time T2, clamp pulse CLP becomes low level to cause the potential difference between the output voltage of the vertical signal line 520 and the clamp voltage CPDC at the time to be held by the clamp capacitor 610. At time T4, the control line READ (n) becomes high level to cause electric charges accumulated in the photodiode 501 to be transferred to the FD portion 506 and a voltage change as a function of the electric charges to occur on the vertical signal line 520. Because the terminal of the clamp capacitor 610 on the side of the column gain amplifier 660 is maintained at the clamp voltage CPDC due to virtual grounding of the operational amplifier 660, the amount of displacement occurring on the vertical signal line 520 appears as a certain voltage ratio on the output terminal side of the feedback capacitor 670. The voltage change $\Delta V$ occurring on the vertical signal line 620 at the time is represented by Equation (10), where $\Delta V$in represents the voltage change on the vertical signal line 520, Ccp represents the capacitance value of the clamp capacitor, and Cf represents the capacitance value of the feedback capacitor:

$$\Delta V = Ccp/Cf \times \Delta Vin \quad (10)$$

At time T4, the control line SP becomes low level, and voltage of the vertical signal line 620 including the voltage change $\Delta V$ is retained in the accumulating capacitors 200a to 200e. At times T5 and T6, control lines CSEL (m) and CSEL (m-1) successively become high level, causing the voltage change to be output to the horizontal common line 570, amplified or buffered in the output amplifier 580, and output to the output terminal OUT. This output voltage $\Delta V$out is represented by Equation (11), where Ccom represents the capacitance value of the parasitic capacitance 210 of the horizontal common line 570 and Gamp represents the gain of the output amplifier 580. Similar operations take place in the n+1th and subsequent rows.

$$\Delta Vout = \Delta V \times Csp/(Csp+Ccom) \times Gamp \quad (11)$$

An operation mode with two-row addition can be realized as in the first embodiment. The present embodiment can improve signal gain in the column gain amplifier 660. In addition, as to decrease in signal amplitude due to reading to the horizontal common line 570, Equations (8) and (9) for the two-row addition mode involves a further decrease in signal amplitude that is four fifth the decrease of Equation (2), which corresponds to the non-addition mode. This decrease in gain could be compensated for. It is also possible to configure the feedback capacitor 670 to be switched according to reading mode. For example, when the capacitance value of the feedback capacitor 670 in the non-addition mode is represented as Cf, by setting the capacitance value of feedback capacitor 670 in the two-row addition mode to ⅘ Cf, voltage conversion factors for a certain light quantity used in the two modes can be made close to each other.

As described above, with the solid-state imaging apparatus according to the present embodiment, vertical adding operations can be performed without causing misalignment of color gravity centers even in vertical addition in units of two rows in a color solid-state imaging apparatus. In addition, although the present embodiment illustrates the five accumulating capacitors 200a to 200e as having an equal capacitance value, this is not limitative. For example, the present embodiment is also effective when capacitance allocation ratio is changed such as by integrating accumulating capacitors 200b and 200c into one capacitor having a capacitance value of ⅖ Csp, instead of two capacitors, and reducing the number of sampling and holding switches 630a to 630e.

During a first adding operation (or step) for green (a first color) in the first and second embodiments, the row selecting circuit 530 successively selects pixels in multiple rows. The selecting switches 630a to 630e accumulate pixels signals from pixels covered with a color filter of the color into a part of the capacitors 200a to 200e, out of pixels in the rows selected by the row selecting circuit 530. Thereafter, the selecting switches 630a to 630e add pixel signals accumulated in the part of the capacitors 200a to 200e on the vertical signal line 620.

During the second adding operation (step) for green after the first adding operation for green, the row selecting circuit 530 successively selects pixels on other multiple rows. The selecting switches 630a to 630e accumulate pixels signals from pixels covered with a color filter of the color in a part of the capacitors 200a to 200e, out of pixels in the rows selected by the row selecting circuit 530. Thereafter, the selecting switches 630a to 630e add pixel signals accumulated in the part of the capacitors 200a to 200e on the vertical signal line 620.

During the first adding operation for green, the selecting switches 630a to 630e add pixel signals accumulated in a part of the capacitors 200a to 200e on the vertical signal line 630. In the second adding operation for green, the selecting switches 630a to 630e adds pixel signals from pixels in a row other than the rows used in the first adding operation for green, using pixels signals accumulated in other part of the capacitors 200a to 200e.

Specifically, the capacitors include first to fourth capacitors 200a to 200e. During the first adding operation for green (the first color), the selecting switches 630a to 630e accumulate pixel signals from pixel G2 in the first green row into the second capacitors 200*b* and 200*c*, and accumulate pixel signals from pixel G3 in the second green row into the first and fourth capacitors 200*a* and 200*e*. Thereafter, the selecting switches 630*a* to 630*e* add pixel signals accumulated in the first, second, and third capacitors 200*a* to 200*d* on the vertical signal line 620.

Then, during the first adding operation for red (the second color), the selecting switches 630*a* to 630*e* accumulate the pixel signal from pixel R2 in the first red row into the second capacitors 200*b* and 200*c*, and accumulate the pixel signal from pixel R3 in the second red row into the first and third capacitors 200*a* and 200*d*. Thereafter, the selecting switches 630*a* to 630*e* add pixel signals accumulated in the first, second, and third capacitors 200*a* to 200*d* on the vertical signal line 620.

Then, during the second adding operation for green, the selecting switches 630*a* to 630*e* accumulate the pixel signal from pixel G4 in the third green row into the second capacitors 200*b* and 200*c*, and accumulate the pixel signal from pixel G5 in the fourth green row into the first and third capacitors 200*a* and 200*d*. Thereafter, the selecting switches 630*a* to 630*e* add pixel signals accumulated in the first, second, and fourth capacitors 200*a* to 200*c* and 200*e* on the vertical signal line 620.

The first and second embodiments are applicable to a solid-state imaging apparatus for use as a digital still camera or to all sorts of solid-state imaging apparatus for capturing images, such as digital camcorders and monitoring cameras.

The above-described embodiments merely illustrate specific examples of practicing the present invention and the technical scope of the invention should not be construed as limitative with those embodiments. That is to say, the present invention can be practiced in any of various forms without departing from the technical idea or key features thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-165056, filed Jul. 13, 2009, which is hereby incorporated by reference herein in its entirety.

What is claimed is:

1. A solid-state imaging apparatus comprising:
a plurality of pixels arranged two dimensionally wherein each of pixels includes a photoelectric conversion element for generating a pixel signal by photoelectric conversion;
a plurality of color filters of a plurality of colors arranged above the photoelectric conversion elements;
a row selecting unit for selecting a row of the pixels;
a signal line to which the pixel signal is output from the pixels of the row selected by the row selecting unit;
a plurality of capacitors for accumulating the pixel signal output to the signal line; and
a plurality of selecting switches each connected between the signal line and corresponding one of the plurality of capacitors, wherein,
during a first adding operation, the row selecting unit selects a plurality of rows of the pixels successively and the selecting switches are controlled to accumulate, in a part of the plurality of capacitors, each of the pixel signals from the pixels, with which the color filters of the same color are associated, thereafter, the selecting switch operates to add, on the signal line, the pixel signals accumulated in the part of the plurality of capacitors,
during a second adding operation after the first adding operation, the row selecting unit selects another plurality of rows of the pixels successively and the selecting switches are controlled to accumulate, in a part of the plurality of capacitors, each of the pixel signals from the pixels, with which the color filters of the same color are associated, thereafter, the selecting switch operates to add, on the signal line, the pixel signals accumulated in the part of the plurality of capacitors, and,
during the first adding operation, the row selecting unit controls the selecting switches to add, on the signal line, the pixel signals accumulated in the part of the plurality of capacitors, while, during the second adding operation, the row selecting unit controls the selecting switches to add the pixel signals accumulated in the other part of the plurality of capacitors with the pixel signals from the pixels of a row different from the row of the pixels of which pixel signals are added in the first adding operation.

2. The solid-state imaging apparatus according to claim 1, wherein
the plurality of capacitors include first to fourth capacitors,
during the first adding operation, the row selecting unit accumulates the pixel signal from a pixel in a first row in the second capacitor, and accumulates the pixel signal from a pixel in a second row in the first and fourth capacitors, and thereafter, the row selecting unit adds, on the signal line, the pixel signal accumulated in the first and second capacitors to the pixel signal accumulated, before the first adding operation, in the third capacitor, and
during the second adding operation, the row selecting unit accumulates the pixel signal from a pixel in a third row in the second capacitor, and accumulates the pixel signal from a pixel in a fourth row in the first and third capacitors, and thereafter, the row selecting unit adds, on the signal line, the pixel signal accumulated in the first and second capacitors to the pixel signal accumulated, during the first adding operation, in the fourth capacitor.

3. The solid-state imaging apparatus according to claim 2, wherein
the first, third and fourth capacitors have the same capacitance value, which equals to ½ of a capacitance value of the second capacitor.

4. The solid-state imaging apparatus according to claim 3, wherein
the second capacitor comprises two capacitors each of which has a capacitance value equal to the capacitance value of the first, third and fourth capacitors.

5. The solid-state imaging apparatus according to claim 2, wherein
the first adding operation includes following operations (1) to (4) performed in this order:
(1) the row selecting unit accumulates the pixel signal from the pixel in the first row of a first color in the second capacitor, and accumulates the pixel signal from a pixel in the second row of the first color in the first and fourth capacitors;
(2) the row selecting unit adds, on the signal line, the pixel signal accumulated in the first and second capacitors to the pixel signal accumulated in the third capacitor;
(3) the row selecting unit accumulates the pixel signal from the pixel in the first row of a second color in the second capacitor, and accumulates the pixel signal from a pixel in the second row of the second color in the first and fourth capacitors; and (4) the row selecting unit adds, on the signal line, the pixel signal accumulated in the first or second capacitor to the pixel signal accumulated in the third capacitor; and the second adding operation includes following operations (5) to (6) performed in this order:

(5) the row selecting unit accumulates the pixel signal from the pixel in the third row of the first color in the second capacitor, and accumulates the pixel signal from a pixel in the fourth row of the first color in the first and third capacitors; and (6) the row selecting unit adds, on the signal line, the pixel signal accumulated in the first and second capacitors to the pixel signal accumulated in the fourth capacitor.

6. A method of driving solid-state imaging apparatus comprising:

a plurality of pixels arranged two dimensionally wherein each of pixels includes a photoelectric conversion element for generating a pixel signal by photoelectric conversion;

a plurality of color filters of a plurality of colors arranged above the photoelectric conversion elements;

a row selecting unit for selecting a row of the pixels;

a signal line to which the pixel signal is output from the pixels of the row selected by the row selecting unit;

a plurality of capacitors for accumulating the pixel signal output to the signal line; and a plurality of selecting switches each connected between the signal line and a corresponding one of the plurality of capacitors, wherein the method comprising:

a first adding step for electing, by the row selecting unit, a plurality of rows of the pixels successively, and accumulating, in a part of the plurality of capacitors, the pixel signals from the pixels of the plural rows selected, thereafter, adding, on the signal line, the pixel signals accumulated in the part of the plurality of capacitors; and a second adding step after the first adding step, for selecting, by the row selecting unit, another plurality of rows of the pixels successively, and accumulating, in a part of the plurality of capacitors, each of the pixel signals from the pixels, thereafter, adding, on the signal line, the pixel signals accumulated in the part of the plurality of capacitors, and, during the first adding step, the pixel signals accumulated in the part of the plurality of capacitors are added on the signal line, while, during the second adding operation, the pixel signals accumulated in the other part of the plurality of capacitors are added with the pixel signals from the pixels of a row different from the row of the pixels of which pixel signals are added in the first adding operation.

* * * * *